United States Patent [19]
Patel et al.

[11] Patent Number: 6,011,968
[45] Date of Patent: Jan. 4, 2000

[54] CELLULAR MODEM POOL FOR SENDING FAXES OVER CELLULAR COMMUNICATIONS CHANNELS

[75] Inventors: Satya A. Patel, Middletown; Kris A. Rasmussen, Tinton Falls, both of N.J.

[73] Assignee: Paradyne Corporation, Largo, Fla.

[21] Appl. No.: 08/950,477

[22] Filed: Oct. 15, 1997

Related U.S. Application Data

[63] Continuation of application No. 08/573,702, Dec. 18, 1995.

[51] Int. Cl.$^7$ ..................... H04Q 7/22
[52] U.S. Cl. ................ 455/414; 375/8; 370/324
[58] Field of Search .............. 455/414; 375/8; 370/324

[56] References Cited

U.S. PATENT DOCUMENTS

| | | | |
|---|---|---|---|
| 4,476,496 | 10/1984 | Thaler | 358/286 |
| 4,878,228 | 10/1989 | Takahashi | 375/3 |
| 5,021,890 | 6/1991 | Yoshida et al. | 358/405 |
| 5,123,033 | 6/1992 | Beck | 375/121 |
| 5,200,991 | 4/1993 | Motoyanagi . | |
| 5,202,899 | 4/1993 | Walsh | 375/8 |
| 5,237,429 | 8/1993 | Zuiss et al. | 358/442 |
| 5,243,438 | 9/1993 | Anderton et al. | 358/426 |
| 5,263,078 | 11/1993 | Takahashi et al. | 379/58 |
| 5,282,238 | 1/1994 | Berland | 379/58 |
| 5,291,479 | 3/1994 | Vaziri et al. | 370/58.2 |
| 5,353,334 | 10/1994 | O'Sullivan . | |
| 5,369,501 | 11/1994 | Wilson et al. | 358/407 |
| 5,487,175 | 1/1996 | Bayley et al. . | |
| 5,513,212 | 4/1996 | Bremer | 375/222 |
| 5,555,100 | 9/1996 | Bloomfield et al. | 358/402 |
| 5,619,531 | 4/1997 | Taylor et al. | 375/222 |
| 5,636,282 | 6/1997 | Holmquist et al. | 380/25 |
| 5,640,417 | 6/1997 | Barabash et al. | 375/222 |
| 5,663,982 | 9/1997 | Hodge et al. | 375/222 |
| 5,673,266 | 9/1997 | Li | 370/465 |
| 5,673,268 | 9/1997 | Sharma et al. | 370/522 |
| 5,682,602 | 10/1997 | Walker et al. | 455/33.2 |
| 5,694,420 | 12/1997 | Ohki et al. | 375/222 |
| 5,726,764 | 3/1998 | Averbuch et al. | 358/403 |
| 5,752,199 | 5/1998 | Scott | 455/557 |
| 5,787,364 | 7/1998 | Exner et al. | 455/560 |
| 5,852,604 | 12/1998 | Cooley et al. | 370/324 |

OTHER PUBLICATIONS

U.S. Patent application by Patel, et al., entitled "Method and Apparatus for Bypassing a Cellular Modem Pool During a Fax Transmission," Ser. No. 08/573,701, filed Dec. 18, 1995.

U.S. Patent application by Robert E. Scott, entitled "The Use of Compression to Improve the Sending of Faxes Over Analog Cellular," Ser. No. 08/573,700, filed Dec. 18, 1995.

*Primary Examiner*—William Cumming
*Attorney, Agent, or Firm*—Thomas, Kayden, Horstemeyer & Risley, L.L.P.

[57] ABSTRACT

A Mobile Switching Center (MSC) includes a cellular modem pool that comprises a number of pairs of modems in which the data terminal equipment (DTE) ports of each modem pair are cross-connected in a "back-to-back" fashion. This allows the two modems of each pair to interchange data via their DTE ports and thereby isolate that portion of the cellular fax call over the cellular communications channel from that portion of the cellular fax call through the public-switched telephone network (PSTN). Fax information is transmitted over both the PSTN-portion of the cellular fax call and the cellular portion of the cellular fax call using standard fax modulation techniques. The cellular-side modem of each modem pair is adapted to recover fax handshaking and data signaling from the received—fax modulated—signal and translate the recovered fax information into "AT-type commands" for application to the corresponding PSTN-side modem of the modem pair. The PSTN-side modem, in a similar fashion, is adapted to recover fax handshaking and data signaling from the received—fax modulated—signal and translate the recovered fax information into "AT-type commands" for application to the corresponding cellular-side modem.

16 Claims, 4 Drawing Sheets

CELLULAR MODEM POOL FOR SENDING FAXES OVER CELLULAR COMMUNICATIONS CHANNELS

This application is a continuation of application Ser. No. 08/573,702, filed Dec. 18, 1995, now abandoned.

CROSS-REFERENCE TO RELATED APPLICATIONS

Related subject matter is disclosed in the co-pending commonly assigned, U.S. Patent application of Scott, entitled "The Use of Compression to Improve the Sending of Faxes over Analog Cellular," Ser. No. 08/573,700, filed on Dec. 18, 1995; and now U.S. Pat. No. 5,573,739 to Scott, entitled "An Improved Method For Sending Faxes over Analog Cellular," issued on May 12, 1998, now U.S. Pat. No. 5,920,402.

BACKGROUND OF THE INVENTION

The present invention relates to facsimile communications over wireless links, and, more particularly, to facsimile (fax) communications over a cellular communications channel.

A cellular modem pool comprises a number of pairs of modems, in which the data terminal equipment (DTE) ports of each modem pair are cross-connected in a "back-to-back" fashion. This allows the two modems of each pair to interchange data via their DTE ports and thereby isolate that portion of the data connection over the cellular communications channel from that portion of the data connection through the public-switched-telephone-network (PSTN). This isolation allows the use of a data protocol that is better suited to combating the effects of the cellular environment over the cellular portion of the data connection. One example of a cellular-oriented protocol is the "Enhanced Throughput Cellular" (ETC) protocol, developed by AT&T Paradyne. Similarly, on the PSTN side of the data connection, the cellular modem pool concept allows the modems at each endpoint of the PSTN connection to use a more traditional, e.g., V.32bis, land-line oriented protocol. In offering such a service, a cellular provider typically discounts calls through the cellular modem pool so that a data call is cheaper than a cellular voice call.

Unfortunately, routing a data call through a cellular modem pool presents a number of problems. One such problem is the ability to provide call progress information to a calling party. U.S. Pat. No. 5,787,364 of Exner et al., entitled "Transparent Call Progress," filed on Jan. 30, 1995, describes a method and apparatus that solves this problem.

However, another problem with a cellular modem pool is facsimile (fax) communications. Fax communications has, in a sense, its own world of protocols and modulation techniques that make it difficult to use a cellular modem pool in a straight forward way to establish a fax call.

SUMMARY OF THE INVENTION

In accordance with the inventive concept, we have realized a method and apparatus for establishing a fax call through a cellular modem pool. In particular, each modem of a cellular modem pool translates fax handshaking and fax-data signals to an equivalent "AT-type command." While this inventive concept requires altering existing modems, no change is required in the fax terminal equipment.

In an embodiment of the invention, an MSC includes a cellular modem pool that comprises a number of pairs of modems in which the data terminal equipment (DTE) ports of each modem pair are cross-connected in a "back-to-back" fashion. This allows the two modems of each pair to interchange data via their DTE ports and thereby isolate that portion of the cellular fax call over the cellular communications channel from that portion of the cellular fax call through the PSTN. Fax information is transmitted over both the PSTN-portion of the cellular fax call and the cellular-portion of the cellular fax call using standard fax modulation techniques, herein referred to as "fax modulation." The cellular-side modem of each modem pair is adapted to recover fax handshaking and data signaling from the received—fax modulated—signal and translate the recovered information into "AT-type commands" for application to the corresponding PSTN-side modem of the modem pair. The PSTN-side modem, in a similar fashion, is adapted to recover fax handshaking and data signaling from the received—fax modulated—signal and translate the recovered information into "AT-type commands" for application to the corresponding cellular-side modem.

DETAILED DESCRIPTION

Figure 1:
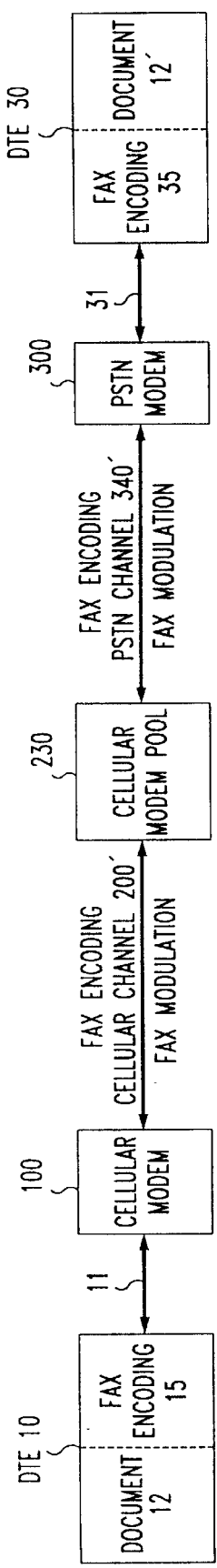
FIG. 1 shows an illustrative high-level block diagram of a cellular communications system embodying the principles of the invention.

As background, it should be noted that fax transmission is governed by a number of standards. For example, the following standards specify the fax data rate and modulation schemes: ITU V.17 defines half-duplex 14.4 kbps modulation; ITU V.29 defines half-duplex 9.6 kbps modulation; and ITU V.27ter defines half-duplex 4.8 kbps modulation. In addition to the specification of the fax data rate and modulation schemes, ITU T.4 defines the fax image encoding scheme, generally know as Group 3. Most fax equipment or services currently provided are Group 3 faxes. Group 2 and Group 1 fax schemes, as specified by ITU T.3 and T.2, respectively, are much older, slower and simpler. As a result, for the purposes of the following description, Group 3 fax is assumed. Finally, ITU V.21 channel 2 specifies a 300 bps frequency-shift-keying (FSK) modulation used during fax handshaking procedures, which are specified in ITU T.30. The latter defines five phases of a fax call: call establishment, pre-message, message transmission, post message, and call release. Fax handshaking occurs during all phases except the message transmission phase, during which time the Group 3 encoded data is transmitted using one of the above mentioned fax modulation schemes. The function of handshaking, among other things, is to allow each fax endpoint to determine the capabilities of the opposite fax endpoint such as highest supported data rate, page resolution, page size, etc. It should be noted that the ITU T.30 fax handshaking protocol allows for manual operation, where a user can originate or answer a call using a phone connected to the fax device, and then switch to fax mode; and an automatic mode of operation. For the purposes of the examples below, it is assumed that all fax equipment operate in automatic mode.

In addition to the above fax standards, two fax standards define the "class" of fax equipment by specifying the distribution of fax functionality between the DTE and data communications equipment (DCE). Standard EIA/TIA-578 defines Class 1 fax, where the DTE is responsible for providing ITU T.30 and T.4 functionality, while the DCE does the modulation, etc. In comparison, standard EIA/TIA-592 defines Class 2 fax, where the DTE is responsible for ITU T.4 only, while the DCE provides ITU T.30 functionality in addition to the modulation, etc. For the purposes of the following description, fax Class 2 is assumed.

In Group 3 fax, the DTE, which is responsible for ITU T.4 functionality, determines the type of fax encoding, or fax compression, scheme by negotiating with the opposite fax endpoint during the above-mentioned handshaking. One type of fax encoding, or fax compression, is termed "1-D," which compresses one line at a time of an image, or document. Another type of fax compression is termed "2-D," which processes multiple lines of an image, or document. For example, "2-D" fax encoding compresses information on a current line of the document by taking into account what has changed from the previous line of the document. Generally speaking, a 30 to 40% increase in data throughput occurs when using "2-D" fax encoding.

An illustrative high-level block diagram of a cellular communications system embodying the principles of the invention is shown in FIG. 1. For the moment, it is assumed that a cellular fax call has already been established between the cellular fax endpoint, as represented by DTE 10 and cellular modem 100, and the PSTN fax endpoint, as represented by DTE 30 and PSTN modem 300. Both fax endpoints conform to class 2 fax. The term "cellular user" is associated with the cellular fax endpoint and the term "PSTN user" is associated with the PSTN fax endpoint. It is assumed that DTE 10 is a personal computer, e.g., a laptop, configured with fax application software 15 that is capable of transmitting or receiving fax information via line 11, which is coupled to cellular modem 100. Similarly, it is assumed for simplicity that DTE 30 is also representative of a personal computer. It should be noted that the combination of a modem and DTE, e.g., PSTN modem 300 and DTE 30, can equivalently represent a fax machine with an integrated modem. The cellular fax call will be described in the context of transmitting fax information, e.g., document 12, from DTE 10 to DTE 30. Although not described herein, the inventive concept also applies to a call originating from a point within the PSTN network to a cellular endpoint.

DTE 10 provides a fax encoded signal to cellular modem 100. The latter transmits the fax encoded signal according to a standard fax modulation over cellular channel 200', which is described further below and is representative of the mobile transceiver, cellular channel, cell site transceiver, etc.

Cellular modem pool 230 receives the fax modulated signal. Cellular modem pool 230 comprises a number of pairs of back-to-back modems (described below). The cellular-side modem of each modem pair recovers fax handshaking and data signaling from the received fax modulation and translates the recovered information into "AT-type commands" for application to the corresponding PSTN-side modem of the modem pair. The PSTN-side modem translates the received "AT-type commands" to recover any fax signaling and fax encoded data and transmits this information using fax modulation over PSTN channel 340' (described below) to PSTN modem 200. The latter recovers the fax encoded signal and provides this signal to DTE 30, which, using fax application software 35, recovers document 12'. It should be noted that no modification to the fax equipment of either the cellular or PSTN endpoint is required. Since in this example the document 12 is being transmitted from DTE 10 to DTE 30, the PSTN-side modem of cellular modem pool 230 only receives fax handshaking signals for transmission back to DTE 10. As a result, and in accordance with the principles of the invention, the PSTN-side modem, like the cellular-side modem, recovers fax handshaking and data signaling from the received—fax modulated—signal and translates the recovered information into "AT-type commands" for application to the corresponding cellular-side modem for transmission to the cellular user.

Figure 2:
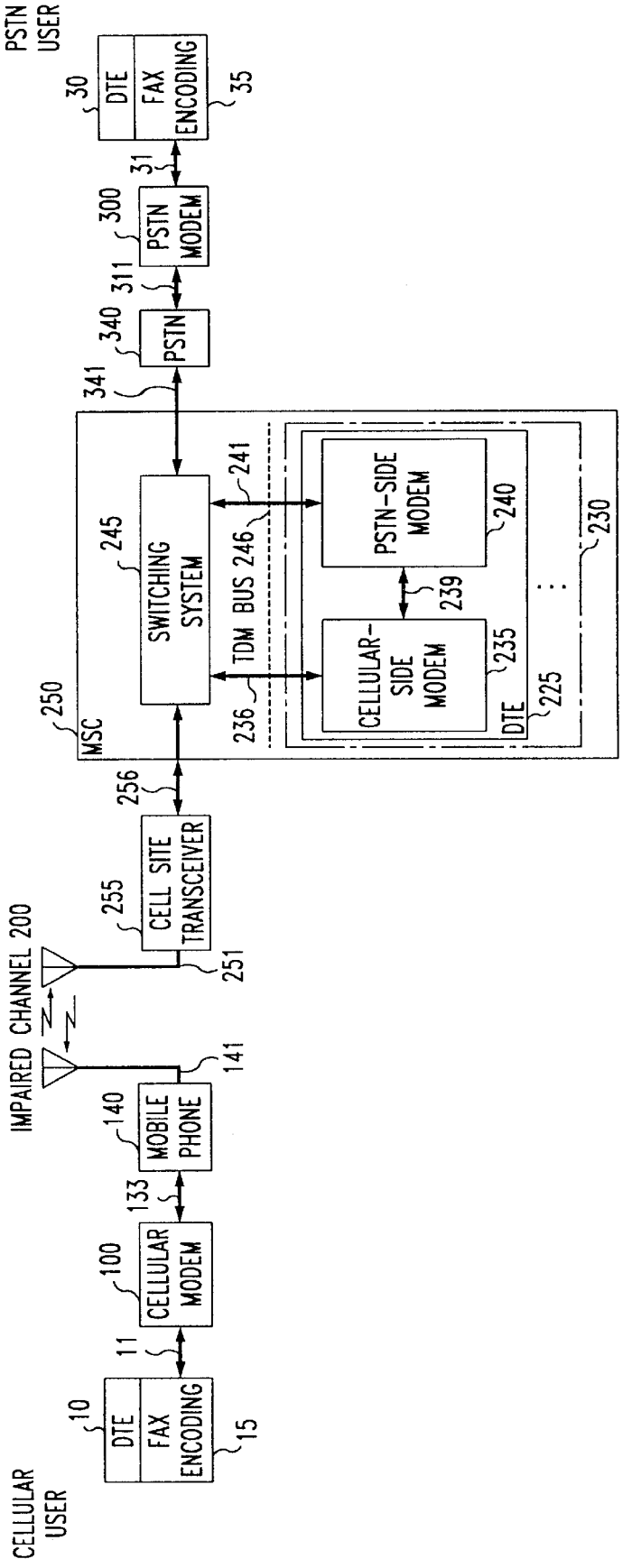
FIG. 2 shows a more detailed block diagram of the cellular communications system of FIG. 1.

A more detailed block diagram is shown in FIG. 2. As described above, DTE 10 provides a fax encoded signal via line 11 to cellular modem 100. The latter provides a modulated fax signal for transmission to mobile phone 140, via line 133. As known in the art, line 133 may include an RJ11 adapter for coupling the DCE interface of cellular modem 100 to the local signaling interface of the mobile phone. The cellular transceiver (not shown) of mobile phone 140 further modulates the signal provided by cellular modem 100 onto a cellular carrier, which is transmitted to cell site transceiver 255, via impaired channel 200. Cell site transceiver 255 demodulates the received cellular signal to provide a received digital version of the modulated fax signal to MSC 250 via line 256, which is typically a T1 facility.

MSC 250 includes switching system 245 and cellular modem pool 230. The latter comprises a number of pairs of back-to-back modems as represented by modem pair 225. As known in the art, switching system 245 provides the received digital version of the modulated data signal to modem pair 225 of cellular modem pool 230, via line 236. Modem pair 225 converts the fax modulation signal provided by cellular modem 100 to a another fax modulation signal for transmission over the PSTN portion of the cellular fax call via line 241. The PSTN portion of the cellular fax call is represented by PSTN facility 341, PSTN 340, and line 311, which represents the local-loop coupling PSTN modem 300 to a local exchange carrier (not shown) included within PSTN 340. It should be noted that lines 236 and 241 have been shown as separate lines for simplicity. However, lines 236 and 241 are typically representative of allocated time slots of time-division multiplexed bus 246 that couples each modem pair of cellular modem pool 230 to switching system 245.

Each modem of modem pair 225 is known in the art as a "mu-law" modem because each modem couples directly to the above-mentioned time-division multiplexed bus as represented by lines 236 and 241. Modem pair 225 comprises cellular-side modem 235 and PSTN-side modem 240, both of which are coupled together via their DTE interfaces as represented by line 239.

Figure 3:
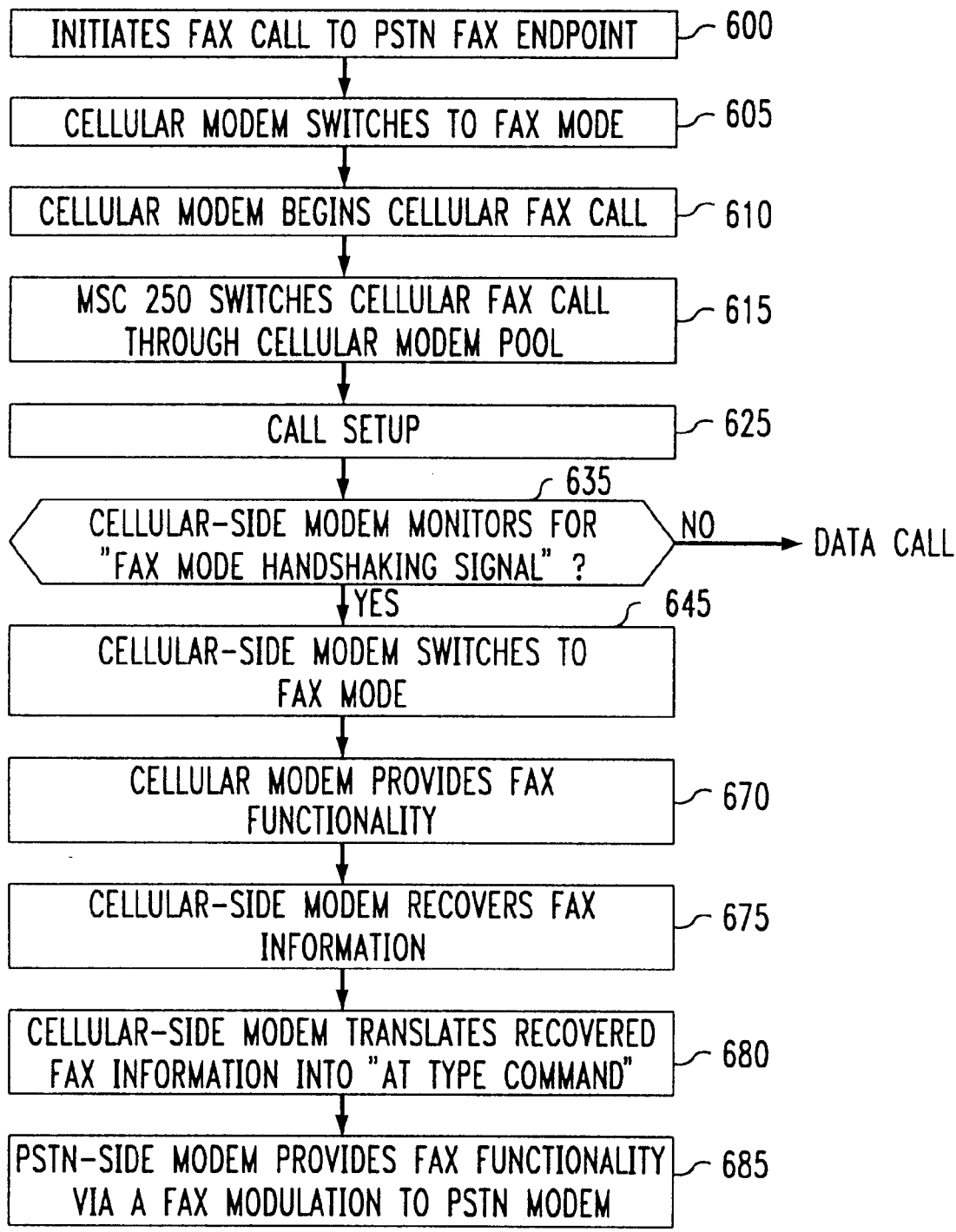
FIG. 3 shows a flow diagram for processing a fax call in accordance with the principles of the invention.

Having described the data flow through an established cellular fax call, the fax call processing in accordance with the principles of the invention is now described. It is assumed that the cellular user initiates the fax call and desires to utilize cellular modem pool 230. An illustrative flow diagram embodying the principles of the invention is shown in FIG. 3. In step 600, the cellular user initiates a cellular fax call to the opposite PSTN fax endpoint. For example, the cellular user dials both an access code, e.g., "*DATA," and a telephone number associated with the called party, who is represented by the PSTN fax endpoint. To perform the dialing function, the cellular user enters the well-known "AT dialing command," via DTE 10, using fax application software 15.

Upon receiving the above-mentioned "AT dialing command," cellular modem 100 switches into a fax mode of operation in step 605. (It should be noted that it is well-known that the type of transmission, fax or data, is communicated to a corresponding modem, or DCE, via an "AT-type command." Consequently, a cellular modem embodying the principles of this invention can transition to a fax mode of operation upon detection of FAX-specific "AT command" parameters. For example, even a pre-stored telephone number within the modem could be associated with a facsimile endpoint.) Cellular modem 100 begins the cellular fax call in step 610 by transmitting the "*DATA" and received telephone number to mobile phone 140, which sets up a cellular telephone call with switching system 245 of MSC 250.

It is assumed here that MSC 250 does not provide a transparent call progress feature that allows the cellular user to hear the call progress on the PSTN-side of the cellular fax connection. A transparent call progress feature is described in the copending, commonly assigned, U.S. Patent application of Exner et al entitled "Transparent Call Progress," Ser. No. 08/380,872, filed on Jan. 30, 1995. If a mobile switching center does provide a transparent call progress feature then it is assumed that the mobile switching center is appropriately modified so that a cellular user can enable or disable this feature on a per-call basis, e.g., by entering a predefined special (*) code as is known in the art, e.g., as is currently done to enable and disable call-waiting notification. This disabling of the transparent call progress feature can be put in effect even if the mobile switching center provides an audio path for fax calls as described in the co-pending U.S. Patent application of Patel el. "Method and Apparatus for Bypassing a Cellular Modem Pool During a Fax Transmission," Ser. No. 08/573,701, filed on Dec. 18, 1995.

In step 615, switching system 245 detects the "*DATA" access code and switches the incoming call through cellular modem pool 230. (A "*DATA" access code alerts switching system 245 that the cellular user wants to route the call through cellular modem pool 230.) As known in the prior art, switching system 245 selects an idle back-to-back modem pair of cellular modem pool 230 and assigns time slots as represented by lines 236 and 241 to the selected modem pair. In this example, the selected pair of back-to-back modems is represented by modem pair 225.

Once modem pair 225 of cellular modem pool 230 is switched in, call setup occurs in step 625 just as if the call was a data call to provide an equivalent "off-hook" and "ringing signal" to PSTN modem 300. In step 635, cellular-side modem 235 monitors for a "fax calling tone" signal. If no fax calling tone signal is detected, e.g., after a predefined time-out, cellular-side modem switches to data mode and the call completes as a data call as known in the art. However, upon detection of a fax calling tone, cellular-side modem 235 switches to fax mode in step 645 and provides fax functionality in step 670, e.g., using V.21. In accordance with the invention, in step 680, cellular-side modem 235 applies any recovered fax handshaking and fax encoded data to PSTN-side modem 240 using suitably defined "AT-type commands." (The concept of an "AT-type command" is well known in the art as a format for passing control, status, and data information to a modem.) For example, cellular modem 100 transmits fax handshaking signaling such as "DCS." Cellular-side modem 240 detects this predefined data sequence after de-modulating and processing the received fax modulation signal. Cellular-side modem 240 then provides predefined "AT-type commands" to PSTN-side modem, where, e.g., one of the predefined "AT-type commands" is associated with "DCS."

PSTN-side modem 240 similarly switches to a FAX mode of operation upon detection of a predefined "AT-type fax command." In step 685, PSTN-side modem 240 receives the above-mentioned "AT-command(s)" and translates any fax handshaking and fax encoded data to the appropriate fax modulation. For example, if PSTN-side modem 240 detects an "AT-type command" signifying the transmission of a fax calling tone, PSTN-side modem 240 provides the fax calling tone in accordance with, e.g., V.21, for transmission to DTE 30. As another example, if PSTN-side modem 240 detects an AT-type command representing "DIS" or "DCS," then PSTN-side modem sends the corresponding fax signaling to PSTN modem 300. Similarly, if PSTN-side modem 240 detects an AT-type command signifying fax encoded data, then PSTN-side modem 240 transmits this data using, e.g., V.17. (Those in the art will realize that PSTN-side modem 240 must monitor the fax handshaking to appropriately store relevant configuration information like whether V.17, V.29, or V.27ter, was negotiated with PSTN modem 300.) In effect, except for the inventive concept, PSTN-side modem operates as in the prior art in performing fax handshaking and fax encoded data communications with PSTN modem 300 to complete the call connection. For example, in addition to passing answer tone information via an "AT-type command" as described above, PSTN-side modem also "trains" on the answer tone in a standard fashion.

Figure 4:
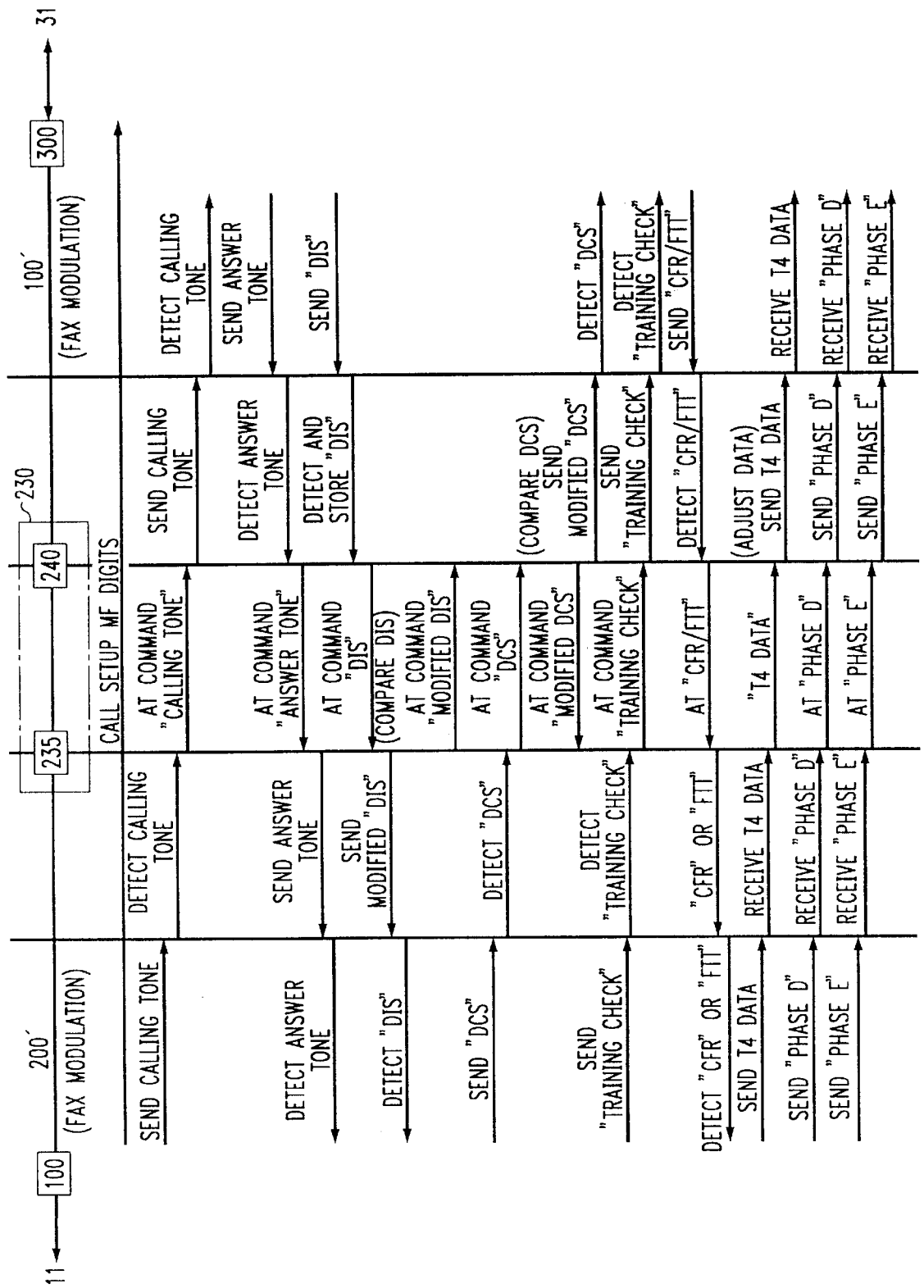
FIG. 4 shows an illustrative signaling chart for use in accordance with the principles of the invention.

Similarly, any fax handshaking and fax encoded data transmitted by PSTN modem 300 is transmitted back to DTE 10 in a reverse fashion. That is, PSTN-side modem 240 translates any received fax handshaking and fax encoded data to "AT-type command(s)" for application to cellular modem 100 via cellular-sided modem 235. An illustrative summary of a portion of the above-described signaling procedure is shown in FIG. 4. As shown in FIG. 4, fax signaling is passed via "AT-type commands" between the cellular-side modem 235 and the PSTN-side modem 240 to establish the fax call between cellular modem 100 and PSTN modem 300 as if the cellular modem pool was not there.

It should be noted that in establishing a facsimile connection, the fax endpoints negotiate parameters such as data rate, page resolution, etc. In particular, the called fax endpoint transmits a "DIS" sequence as shown in FIG. 4 to the opposite-end fax endpoint. In this example, PSTN modem 300 transmits a DIS fax signal to PSTN-side modem 240. The latter, in accordance with the invention, translates the DIS signaling to a sequence of "AT-type commands" that represent such parameters as highest possible data rate, resolution etc., for the PSTN fax endpoint. However, cellular-side modem 235 may not be compatible with some of these requirements. For example, cellular-side modem 235 may have a lower data rate, or a lower page resolution, etc. Consequently, FIG. 4 shows additional steps—not shown in the method of FIG. 3—that may have to be included to effectively complete a fax call through a cellular modem pool.

In particular, upon receiving the "AT-type command" sequence representing a received "DIS" signal from PSTN modem 300, cellular-side modem 235 compares the received "DIS" information such as data rate, page resolution etc., to its own fax call parameters. Cellular-side modem effectively takes the "intersection" of these parameters and transmits a "modified DIS" signaling to cellular modem 100. (The term "intersection" is used to represent the fact the cellular-side modem uses that set of call parameters that are in common between cellular-side modem 235 and PSTN modem 300. For example, if cellular-side modem 235 supports a data rate up to 9600 bits per second, and PSTN modem 300 supports a data rate up to 14,400 bits per second, the "modified DIS" will represent a maximum data rate of 9600 bits per second since that is the maximum data rate that both modems can support.)

Upon receiving the "modified DIS" signaling, the calling fax endpoint compares the received "modified DIS" call parameters to its fax capabilities and, as known in the art, transmits a "DCS" sequence that represents the negotiated set of call parameters for that particular fax call. This "DCS" fax signaling is recovered by cellular-side modem 235 and, in accordance with the principles of the invention, applied to PSTN-side modem 240 via a sequence of predefined "AT-type commands." However, PSTN-side modem 240 may also have a different set of call parameters. Consequently, PSTN-side modem 240 also compares the received "DCS" sequence to its own fax call parameters and transmits the intersection of these via a "modified DCS sequence."

Those in the art should realize that the above-described inventive concept adds some time-delay to the overall establishment of a fax call. For example, both cellular-side modem 235 and PSTN-side modem 240 are interposed into the call-setup path. Consequently, an adjustment of any default time-outs may be necessary to ensure setup of the fax call. For example, after the exchanging of "DIS" and "DCS" signaling, cellular modem 100 sends a "training check" to PSTN modem 300 as shown in FIG. 4. In response, PSTN modem 300 will eventually respond with either "CFR" ("confirmation for receiving") or "FTT" ("failure to train") signaling. As shown in FIG. 4, this signaling is propagated back through the cellular modem pool. However, to avoid any time-out problem, cellular-side modem 235 is further modified to perform the following signaling sequence. In particular, upon detection of a "training check" signal, cellular-side modem 235 not only provides the "training check" signal via an "AT-type command" to PSTN-side modem 240 for transmission to PSTN modem 300, but also transmits back to cellular modem 100 an "FTT" signal in the event a predefined interval is exceeded before detection of a "CFR" or an "FTT" signal from the PSTN-side modem. In response, cellular modem 100 will continue to attempt to send a "training check." (Since cellular modem 100 is receiving some sort of response from the far-endpoint, any default time-out used by cellular modem 100 to disconnect for failure to train should be longer than any default time-out used by cellular modem 100 to disconnect if no response is received.) Once cellular-side modem 235 detects an "AT-type command" representing "CFR," then cellular-side modem 235 stops sending the "FTT" signal and transmits "CFR" to cellular modem 100.

As can be observed from above, if PSTN-side modem 240 does, in fact, modify the "DCS" signal (thereby establishing different call parameters on the PSTN-portion of the fax call), PSTN-side modem 240 must include suitable capacity to, e.g., adjust the subsequent "T4 Data" stream. For example, if PSTN-side modem drops the data rate, suitable buffering and flow control must be provided in PSTN-side modem 240. It should be noted that this capacity can equivalently be performed in the other modem. As illustrated in FIG. 4, PSTN-side modem 240 could notify cellular-side modem 235 of the "modified" DCS. Similarly, operating changes due to a "modified DIS" can be performed in either modem.

Figure 5:
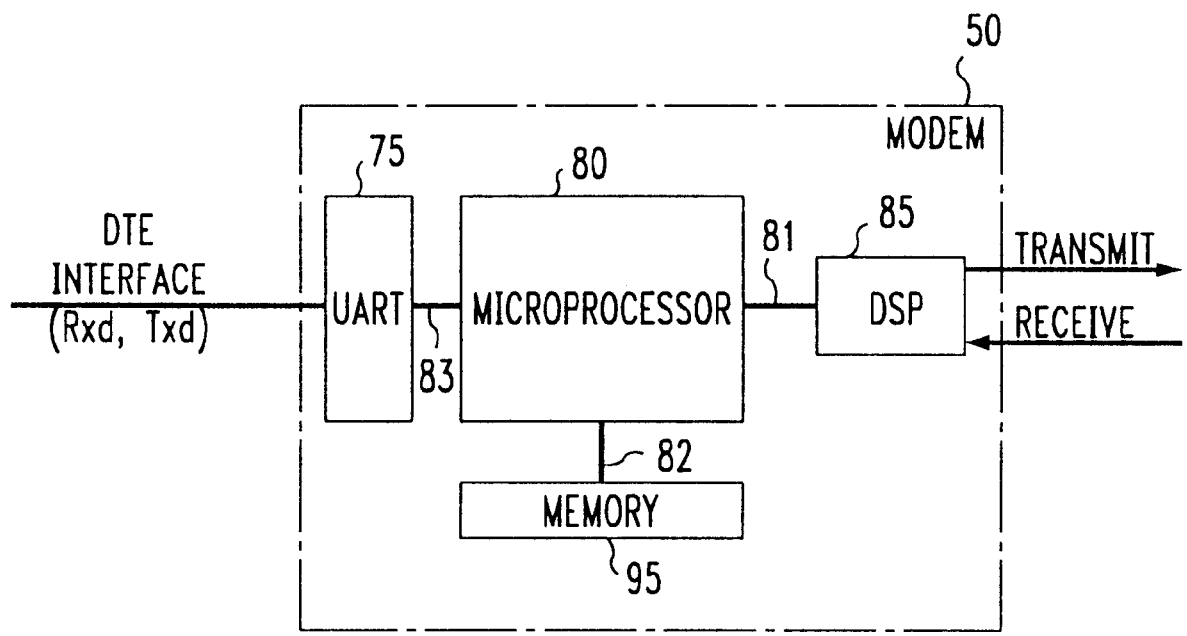
FIG. 5 shows an illustrative block diagram of a modem for use in the cellular communications system of FIG. 2.

FIG. 5 shows an illustrative high-level block diagram of a modem in accordance with the principles of the invention. In particular, modem 50 includes a microprocessor 80, memory 95, a digital signal processor 85, e.g., for providing the tone generator/detector and other modem functions mentioned above, and universal/asynchronous receive transmit (UART) 75 for providing the DTE interface. Microprocessor 80 is coupled to DSP 85 via line 81, which represents, address, data, control, and status leads. In the contexts of this invention, it is assumed that respective portions of the above-described flow chart of FIG. 3 in software. For example, steps 670 and 675 of FIG. 3 is a part of the program stored in memory 95 and executed by microprocessor 80 when FIG. 5 represents cellular-side modem 235.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although the inventive concept was illustrated in the context of a personal computer and a distinct cellular modem, it should be realized that these can be integrated into one physical arrangement for the sending and receiving of faxes in accordance with the principles of the invention.

What is claimed:

1. A cellular modem pool comprising:

a first modem for terminating a cellular-side of a facsimile call where the first modem uses a fax modulation to communicate fax handshaking and fax encoded data with a cellular modem located at a cellular endpoint, the first modem configured to recover facsimile call parameter information from a fax signal transmitted from the cellular modem, the first modem including a data terminal equipment port and further configured to transmit at least one non-modulated signal via the data terminal equipment port in response to the fax signal, the at least one non-modulated signal including the facsimile call parameter information; and a second modem for terminating a public-switched-telephone network side of the facsimile call where the second modem uses a facsimile modulation to communicate fax handshaking and fax encoded data with a far-end modem located at a far-end endpoint, the second modem including a data terminal equipment port coupled to the data terminal equipment port of the first modem, the second modem configured to receive the at least one non-modulated signal and to recover the facsimile call parameter information from the at least one non-modulated signal, the second modem further configured to transmit the facsimile call parameter information to the far-end modem via at least one modulated signal, wherein one of the modems is configured to compare the facsimile call parameter information with data retrieved by the one modem and to modify the facsimile call parameter information in response to a determination that a difference exists between the facsimile call parameter information and the data.

2. The apparatus of claim 1 wherein the non-modulated signal represents V.21 facsimile signaling between the cellular modem and the far-end modem.

3. A method for establishing a facsimile telephone call between a cellular endpoint and a public-switched telephone network (PSTN) endpoint through a cellular modem pool, the cellular modem pool comprising at least one cellular-side modem and at least one PSTN-side modem, wherein the cellular-side modem and the PSTN-side modem are coupled to each other via respective data terminal equipment ports, the method comprising the steps of:

a) using a fax modulation to communicate fax handshaking and fax encoded data between the cellular-side modem and a cellular modem located at the cellular endpoint;

b) using a fax modulation to communicate fax handshaking and fax encoded data between the PSTN-side modem and a far-end modem located at the PSTN endpoint;

c) receiving, at the cellular-side modem, a fax signal from the cellular modem;

d) recovering facsimile call parameter information from the fax signal;

e) transmitting the facsimile call parameter information to the PSTN-side modem via at least one non-modulated signal transmitted via the respective data terminal equipment ports;

f) transmitting the facsimile call parameter information from the PSTN-side modem to the far-end modem;

g) comparing the facsimile call parameter information to data retrieved by one of the modems; and h) modifying the facsimile call parameter information based on the comparing step.

4. The method of claim 3 wherein the at least one non-modulated signal represents V.21 facsimile handshaking signaling between the cellular modem and the PSTN-side modem.

5. The modem pool of claim 1 wherein the at least one non-modulated signal is an AT command.

6. The modem pool of claim 1 wherein the fax signal is a "DCS" fax signal.

7. The modem pool of claim 1 wherein the first modem is further configured to receive a "training check" signal from the cellular modem and to transmit information based on the "training check" signal to the second modem via the data equipment port of the first modem, the first modem further configured to determine whether the first modem receives a "confirmation for receiving" signal from the second modem within a predefined time interval after the first modem received the "training check signal," the first modem further configured to transmit a "failure to train" signal to the cellular modem in response to a determination by the first modem that the first modem failed to receive the "confirmation for receiving" signal during the predefined time interval.

8. The method of claim 3 wherein the at least one non-modulated signal is an AT command.

9. The method of claim 3 wherein the fax signal is a "DCS" fax signal.

10. The method of claim 3 further comprising the steps of:

receiving a "training check" signal from the cellular modem;

transmitting information based on the "training check" signal from the cellular-side modem to the PSTN-side modem in response to the receiving step;

determining whether the cellular-side modem receives a "confirmation for receiving" signal from the PSTN-side modem within a predefined time interval after the cellular-side modem received the "training check" signal from the cellular modem; and transmitting a "failure to train" signal to the cellular modem in response to a determination in the determining step that the cellular-side modem failed to receive the "confirmation for receiving" signal from the PSTN-side modem during the predefined time interval.

11. A cellular modem pool comprising:

a first modem for terminating a public-switched-telephone network side of the facsimile call where the first modem uses a facsimile modulation to communicate fax handshaking and fax encoded data with a far-end modem located at a far-end endpoint, the first modem configured to recover facsimile call parameter information from a fax signal transmitted from the far-end modem, the first modem including a data terminal equipment port and further configured to transmit at least one non-modulated signal via the data terminal equipment port in response to the fax signal, the at least one non-modulated signal including the facsimile call parameter information; and a second modem for terminating a cellular-side of a facsimile call where the second modem uses a fax modulation to communicate fax handshaking and fax encoded data with a cellular modem located at a cellular endpoint, the second modem including a data terminal equipment port coupled to the data terminal equipment port of the first modem, the second modem configured to receive the at least one non-modulated signal and to recover the facsimile call parameter information from the at least one non-modulated signal, the second modem further configured to transmit the facsimile call parameter information to the cellular modem via at least one modulated signal, wherein one of the modems is configured to compare the facsimile call parameter information with data retrieved by the one modem and to modify the facsimile call parameter information in response to a determination that a difference exists between the facsimile call parameter information and the data.

12. The modem pool of claim 11 wherein the at least one non-modulated signal is an AT command.

13. The modem pool of claim 11 wherein the fax signal is a "DIS" signal.

14. A method for establishing a facsimile telephone call between a cellular endpoint and a public-switched telephone network (PSTN) endpoint through a cellular modem pool, the cellular modem pool comprising at least one cellular-side modem and at least one PSTN-side modem, wherein the cellular-side modem and the PSTN-side modem are coupled to each other via respective data terminal equipment ports, the method comprising the steps of:

a) using a fax modulation to communicate fax handshaking and fax encoded data between the cellular-side modem and a cellular modem located at the cellular endpoint;

b) using a fax modulation to communicate fax handshaking and fax encoded data between the PSTN-side modem and a far-end modem located at the PSTN endpoint;

c) receiving, at the PSTN-side modem, a fax signal from the far-end modem;

d) recovering facsimile call parameter information from the fax signal;

e) transmitting the facsimile call parameter information to the cellular-side modem via at least one non-modulated signal transmitted via the respective data terminal equipment ports;

f) transmitting the facsimile call parameter information from the cellular-side modem to the cellular modem;

g) comparing the facsimile call parameter information to data retrieved by one of the modems; and h) modifying the facsimile call parameter information based on the comparing step.

15. The method of claim 3 wherein the at least one non-modulated signal is an AT command.

16. The method of claim 3 wherein the fax signal is a "DIS" signal.

* * * * *

UNITED STATES PATENT AND TRADEMARK OFFICE
CERTIFICATE OF CORRECTION

PATENT NO. : 6,011,968
DATED : January 4, 2000
INVENTOR(S) : Patel et al.

It is certified that error appears in the above-identified patent and that said Letters Patent is hereby corrected as shown below:

Example: Column 3, line 32, after "the", delete "word" and replace with --or--.

Col. 1, line 6, delete "abandoned" and replace therefor -- U.S. Patent No. 5,953,647 --.

Signed and Sealed this

Eighth Day of May, 2001

Attest:

NICHOLAS P. GODICI

Attesting Officer     Acting Director of the United States Patent and Trademark Office